United States Patent [19]

Quayle

[11] Patent Number: 4,465,790

[45] Date of Patent: Aug. 14, 1984

[54] HYDROTREATING CATALYST

[75] Inventor: William H. Quayle, Shelton, Conn.

[73] Assignee: American Cyanamid Company, Stamford, Conn.

[21] Appl. No.: 476,168

[22] Filed: Mar. 17, 1983

[51] Int. Cl.³ .................. B01J 21/04; B01J 21/06; B01J 23/88

[52] U.S. Cl. .................. 502/309; 208/254 H

[58] Field of Search ............ 502/309, 351; 208/254 H, 439

[56] References Cited

U.S. PATENT DOCUMENTS

| | | | |
|---|---|---|---|
| 1,822,848 | 9/1931 | Barclay | 502/351 |
| 2,319,948 | 5/1943 | Pitzer | 502/351 |
| 3,016,346 | 1/1962 | O'Hara | 208/216 R |
| 3,262,874 | 7/1966 | Gatsis | 208/254 H |
| 3,394,077 | 7/1968 | Kovach et al. | 208/254 H |
| 4,196,101 | 4/1980 | Wilson et al. | 502/220 X |
| 4,382,854 | 5/1983 | Wilson et al. | 502/213 X |

Primary Examiner—W. J. Shine
Attorney, Agent, or Firm—Gordon L. Hart

[57] ABSTRACT

Improved hydrodenitrogenation catalysts comprise catalytic metals, e.g. molybdenum and nickel, on supports of co-precipitated alumina and titania with more than 5% of the catalyst weight consisting of titanium oxide in the support.

2 Claims, No Drawings

HYDROTREATING CATALYST

The invention relates to improvements in catalysts useful for catalytic hydrotreating of petroleum distillation fractions and residues. More particularly the invention provides improved catalysts for removal of nitrogen compounds from oils by catalytic treatment with hydrogen.

Catalytic hydrotreating processes are known for petroleum refining, using catalysts comprising metals of groups VI - A and VIII on catalyst supports of alumina or alumina-silica or the like. One such process is catalytic hydrodenitrogenation (HDN) in which the catalytic metals molybdenum and nickel on suitable supports are particularly effective in combination for removal of nitrogen compounds from oils by catalytic treatment with hydrogen.

U.S. Pat. No. 3,016,346 described nickel molybdenum catalysts on supports consisting of alumina and minor amount (0.5 to 5 wt. %) of titania. The finished catalysts contained not more than about 10% by wt of molybdenum. The utilization of small proportions of titania instead of silica in the supports described resulted in improved HDN activity and reduced hydrocracking when the supported catalysts were used for catalytic hydrotreating of middle fraction naphtha in a standard relative activity test. The alumina-titania support used in that test was prepared by a method starting with co-precipitation of aluminum and titanium hydroxides from a solution of titanium tetrachloride and aluminum chloride. A finished alumina-titania support containing 3.7 wt. % titania and about 6% molybdenum was described.

The present invention utilizes catalyst supports of alumina-titania prepared by a process starting with co-precipitation of the metals as a hydrogel from a solution of the sulfates of aluminum and titanium. The hydrogel is washed and dried and the resulting powder is mulled with acid and water to make an extrudable paste. The paste is extruded and the extrudates are dried and calcined to finish the catalyst support. The calcined support is impregnated with a solution of the catalytic metal salts, then dried and calcined again to produce the finished catalyst.

Molybdenum loadings in the range from about 10 to about 25% by wt (as $MoO_3$) and nickel loadings from about 2 to about 10% by wt (as $NiO$) based on the weight of the finished catalyst are typical catalytic metal loadings for hydrodenitrogenation catalysts embodying the invention. Cobalt may also be present in amounts from about 2 to about 10% (as $CoO$) by wt of the finished catalyst.

We use amounts of titania in the support to constitute more than 5%, up to about 40% based on the weight of the finished catalyst. We prefer, however, to use supports made as described, to contain titania in an amount to constitute about 6 to 8% of the finished catalyst weight.

The invention is described in more detail with reference to specific examples described below.

Example 1

A solution containing alum and titanium was made from 113 lbs. $Al_2(SO_4)_3.14H_2O$, 130 lb. $Ti(SO_4)_2.H_2SO_4$ solution (8.3% $TiO_2$) and 147 lb. $H_2O$. A sodium aluminate solution was made from 90 lb. NaOH, 152 lb. $Al_2O_3\cdot 3H_2O$ and 120 lb. $H_2O$. The alum and sodium aluminate solutions were added simultaneously to a heel of 640 lb. $H_2O$, 2.4 lb. 50% gluconic acid and 20 lb. alum solution. The starting temperature was 54° C. and during the addition a pH of 8.5 was maintained. Addition of excess sodium aluminate raised the pH to 10.2. The slurry was filtered and washed twice and then spray dried. One kg of spray dried powder was mulled with 0.7 kg $H_2O$ and 22.5 ml concentrated nitric acid for 50 minutes, extruded into trilobal shaped granules, dried and calcined to give a desired pore structure. The calcined granules were impregnated in a single step with a solution containing nickel, molybdenum and phosphorus. Subsequent drying and calcining provided a catalyst containing nominally 18 wt. % $MoO_3$, 3 wt. % $NiO$, 3 wt. % $P$, 7 wt. % $TiO_2$ and the remainder, $Al_2O_3$.

Example 2

Same as for Example 1 except that 155 lb. $Al_2(SO_4)_3.14H_2O$, 82 lb. $Ti(SO_4)_2.H_2SO_4$ solution and 204 lb. $H_2O$ comprised the alum solution; 145 lb. NaOH, 235 lb. $Al_2O_3.3H_2O$ and 184 lb. $H_2O$ comprised the sodium aluminate solution; 1100 lb. $H_2O$, 2 lb. 50% gluconic acid and 33 lb. alum solution comprised the heel; and the addition pH was maintained at 8.0. One kg of the spray dried powder was mulled with 1 kg $H_2O$ and 7.5 ml concentrated nitric acid. After workup and impregnation the catalyst contained nominally 18% $MoO_3$, 3% $NiO$, 3% $P$, 4% $TiO_2$ and the remainder $Al_2O_3$.

Example 3

Catalysts made as described in Examples 1 and 2 were tested in a standardized laboratory test for determining hydrodenitrogenation activity for the catalysts tested.

A 1″ diameter fixed-bed catalytic reactor is loaded with 100 ml hydrodenitrogenation catalyst and the catalyst is presulfided using 10% $H_2S$ in $H_2$ at the rate 5.5 SCFH, pressure 200 psig and temperatures increasing from 150 to about 700° F. over a period of about eight hours. The bed is then cooled to 450° F. while continuing the $H_2S$ flow at a diminishing rate. The bed is then ready for the hydrotreating process. The reactor is operated at 1400 psig, $H_2$ flow rate 6000 SCF/BBl. With the reactor bed at 450° F., the oil feed is started and a 5% NaOH aqueous solution is fed with the oil at the same liquid volume rate. The bed temperature is raised at a fixed rate to 725° F., at which the temperature is maintained for 60 hours operating time. Samples are taken every 6 hours and analyzed for nitrogen content. Relative HDN activity on a weight basis (RWA) and relative HDN activity on a volume basis (RVA) are calculated from results of the analysis. These activity values compare the measured HDN activity of the test catalyst with that of a conrol HDN catalyst, as measured in an identical test, on basis of activity per unit weight of the test and control catalysts, and activity per unit volume of the test and control catalyst. The activity of the control is assigned a value of 100. A relative activity value of 110 for example indicates activity 10% higher than that of the control.

The control catalyst is a commercial HDN catalyst having the same nominal catalytic metals loading as the test catalysts, on supports made of precipitated alumina.

The oil used for the tests has the specifications shown in Table 1 below.

TABLE 1

| Designation | Gas Oil | | | | |
|---|---|---|---|---|---|
| Gravity, °API @ 60° F. | 23.5 | | | | |
| Nitrogen, Total, (KJEL) wt % | 0.305 | | | | |
| Nitrogen, Basic, wt % | 0.138 | | | | |
| Sulfur, wt % | 1.94 | | | | |
| Hydrogen, micro, wt % | 11.9 | | | | |
| Carbon, micro, wt % | 86.1 | | | | |
| Aniline Point, °F. | 117.7 | | | | |
| Carbon Residue on 10% Botts, wt % | 0.24 | | | | |
| Fischer Water (UTM-21) mg/l | 0.36 | | | | |
| Pour Point, °F. | +5 | | | | |
| Flash Point, PMCC, °F. | 202 | | | | |
| Composition: Volume % (Univ. High Mass) | | | | | |
| Total Aromatics | 31.4 | | | | |
| Monoaromatics | 14.6 | | | | |
| Diaromatics | 9.1 | | | | |
| Triaromatics | 4.7 | | | | |
| Tentraromatics | 1.9 | | | | |
| Pentraromatics | 1.1 | | | | |
| Total Olefins | 9.0 | | | | |
| Total Saturates | 35.8 | | | | |
| Oxygen & Nitrogen Compounds | 5.0 | | | | |
| Sulfur Compounds | 18.7 | | | | |
| Distillation | | | | | |
| Vol % - IBP | 5 | 30 | 50 | 80 | E.P. |
| °F. - 200 | 505 | 582 | 637 | 717 | 805 |

In a series of six tests carried out as described above, testing catalyst samples made as described in Example 1, on supports having about 7 wt % titania, the RWA values were 119, 123, 127, 130, 134 and 137 respectively and the RVA values were 120, 123, 124, 124, 134 and 130, respectively.

In two tests of catalysts made as described in Example 2, containing nominal 4% titania based on total catalyst weight, the RWA values were 95 and 102 and the RVA values were 95 and 97, respectively.

Except for occasional anomalous test results, the HDN catalysts made on alumina-titania supports and which contain more than 5% by wt titania, are found to generally have higher HDN activity than those containing less than 5% of titania.

Catalysts made with catalytic metals loading equivalent to those above on co-precipitated aluminia-titania supports and containing titania in amounts about 16 and 18% by wt, respectively were tested and found to have relative activities 96 RWA, 91 RVA and 114 RWA, 119 RVA, respectively.

The use of sulfates instead of chlorides in the co-precipitation of alumina and titania results in a finished catalyst support that contains less residual chloride, and this provides the advantage that the catalyst is less corrosive than one containing more chloride, when used in steel reactor equipment.

We claim:

1. Hydrodenitrogenation catalyst comprising catalytic molybdenum and nickel on a catalyst support consisting essentially of co-precipitated alumina and titania with an amount of titania in the support sufficient to constitute more than 5% of the catalyst weight of a finished hydrodenitrogenation catalyst made on said support.

2. Hydrodenitrogenation catalyst defined by claim 1 wherein the titania content of the catalyst support constitutes from about 6 to about 8% of the total catalyst weight.

* * * * *